(12) United States Patent
Blaney et al.

(10) Patent No.: US 10,132,193 B2
(45) Date of Patent: Nov. 20, 2018

(54) GAS TURBINE ENGINE DUCT ASSEMBLY (71) Applicant: UNITED TECHNOLOGIES CORPORATION, Farmington, CT (US)

(72) Inventors: Ken F. Blaney, Middleton, NH (US); Michael S. Stevens, Alfred, ME (US)

(73) Assignee: United Technologies Corporation, Farmington, CT (US)

( * ) Notice: Subject to any disclaimer, the term of this patent is extended or adjusted under 35 U.S.C. 154(b) by 282 days.

(21) Appl. No.: 14/911,287

(22) PCT Filed: Aug. 13, 2014

(86) PCT No.: PCT/US2014/050839
§ 371 (c)(1),
(2) Date: Feb. 10, 2016

(87) PCT Pub. No.: WO2015/026591
PCT Pub. Date: Feb. 26, 2015

(65) Prior Publication Data
US 2016/0186606 A1 Jun. 30, 2016

Related U.S. Application Data

(60) Provisional application No. 61/867,192, filed on Aug. 19, 2013.

(51) Int. Cl.
*F01D 25/12* (2006.01)
*F01D 5/08* (2006.01)
(Continued)

(52) U.S. Cl.
CPC ............. *F01D 25/12* (2013.01); *F01D 5/081* (2013.01); *F04D 29/584* (2013.01); *F01D 5/082* (2013.01);
(Continued)

(58) Field of Classification Search
CPC .......... F01D 5/081; F01D 5/082; F01D 25/12; F01D 25/24; F01D 25/14; F01D 9/02;
(Continued)

(56) References Cited

U.S. PATENT DOCUMENTS 3,768,921 A 10/1973 Brown et al.
3,832,090 A 8/1974 Matto
(Continued)

FOREIGN PATENT DOCUMENTS

JP 2011021542 A 2/2011

OTHER PUBLICATIONS

Partial Supplementary European Search Report for Application No. EP 14 83 7738 dated Oct. 13, 2016.
(Continued)

*Primary Examiner* — Richard Edgar
*Assistant Examiner* — Danielle M Christensen
(74) *Attorney, Agent, or Firm* — Carlson, Gaskey & Olds, P.C.

(57) ABSTRACT

A duct assembly according to an exemplary aspect of the present disclosure includes, among other things, a casing body that extends between a flange and a wall, a first discrete cooling passage formed in the casing body and a second discrete cooling passage circumferentially spaced from the first discrete cooling passage. At least one of the first discrete cooling passage and the second discrete cooling passage includes an axial portion and a tangential portion configured to turn a cooling fluid communicated in each of the first and second discrete cooling passages.

18 Claims, 4 Drawing Sheets

(51) Int. Cl.
*F04D 29/58* (2006.01)
*F02C 7/18* (2006.01)
*F01D 9/02* (2006.01)
*F01D 25/24* (2006.01)
*F01D 25/14* (2006.01)
*F02C 6/08* (2006.01)

(52) U.S. Cl.
CPC ............... *F01D 9/02* (2013.01); *F01D 25/14* (2013.01); *F01D 25/24* (2013.01); *F02C 6/08* (2013.01); *F02C 7/18* (2013.01); *F05D 2220/32* (2013.01); *F05D 2260/14* (2013.01); *F05D 2260/20* (2013.01)

(58) Field of Classification Search
CPC ............ F05D 2230/72; F05D 2220/32; F05D 2260/20; F02C 6/08; F02C 7/18; F04D 29/584
See application file for complete search history.

(56) References Cited

U.S. PATENT DOCUMENTS

| | | |
|---|---|---|
| 4,526,511 A | 7/1985 | Levine |
| 4,822,244 A | 4/1989 | Maier et al. |
| 5,402,636 A | 4/1995 | Mize et al. |
| 5,645,397 A | 7/1997 | Soechting et al. |
| 6,183,193 B1 | 2/2001 | Glasspoole et al. |
| 6,722,138 B2 * | 4/2004 | Soechting ................ F02C 7/18 60/785 |
| 8,087,249 B2 | 1/2012 | Ottaviano et al. |
| 2007/0296964 A1 | 12/2007 | Nishimura et al. |
| 2009/0010751 A1 | 1/2009 | McCaffrey et al. |
| 2010/0170259 A1 | 7/2010 | Huffman |
| 2010/0316492 A1 | 12/2010 | Charron et al. |
| 2011/0016869 A1 | 1/2011 | Iwasaki |
| 2011/0079019 A1 | 4/2011 | Durocher et al. |
| 2012/0085104 A1* | 4/2012 | Garin .................... F01D 5/082 60/806 |
| 2012/0315142 A1* | 12/2012 | Bosco .................... F01D 5/081 416/204 R |
| 2013/0078080 A1 | 3/2013 | Durocher et al. |

OTHER PUBLICATIONS

The Extended European Search Report for EP Application No. 14837738.5, dated Feb. 10, 2017.
International Search Report and Written Opinion of the International Searching Authority for International application No. PCT/US2014/050839 dated Nov. 26, 2014.
International Preliminary Report on Patentability for PCT Application No. PCT/US2014/050839, dated Mar. 3, 2016.

* cited by examiner

GAS TURBINE ENGINE DUCT ASSEMBLY

STATEMENT REGARDING FEDERALLY SPONSORED RESEARCH OR DEVELOPMENT

This invention was made with government support under Contract No. FA8650-09-D-2923 0021, awarded by the United States Air Force. The Government therefore has certain rights in this invention.

BACKGROUND

This disclosure relates to a gas turbine engine, and more particularly to a gas turbine engine duct assembly that includes one or more discrete cooling passages and viewing ports.

Gas turbine engines typically include at least a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Many gas turbine engines include duct assemblies that transfer fluids between different locations of the engine. One type of duct assembly is known as a tangential onboard injector (TOBI) assembly. TOBI assemblies impart a swirling movement to a cooling fluid and direct the cooling fluid tangentially to condition downstream hardware. TOBI's and other nozzle assemblies typically include a plurality of segments that must be assembled relative to one another and mounted to surrounding hardware. Blind assembly techniques are often necessary to assemble these segments together. Accordingly, advances in this field of technology are desirable.

SUMMARY

A duct assembly according to an exemplary aspect of the present disclosure includes, among other things, a casing body that extends between a flange and a wall, a first discrete cooling passage formed in the casing body and a second discrete cooling passage circumferentially spaced from the first discrete cooling passage. At least one of the first discrete cooling passage and the second discrete cooling passage includes an axial portion and a tangential portion configured to turn a cooling fluid communicated in each of the first and second discrete cooling passages.

In a further non-limiting embodiment of the foregoing duct assembly, the duct assembly is a tangential onboard injection (TOBI) assembly.

In a further non-limiting embodiment of either of the foregoing duct assemblies, a first component is conditioned by the cooling fluid.

In a further non-limiting embodiment of any of the foregoing duct assemblies, a second component is conditioned by a second cooling fluid communicated along an outer surface of the casing body, the second component different from the first component.

In a further non-limiting embodiment of any of the foregoing duct assemblies, at least one view port extends through the wall.

In a further non-limiting embodiment of any of the foregoing duct assemblies, a plug is removably insertable into the at least one view port.

In a further non-limiting embodiment of any of the foregoing duct assemblies, a retainer is received within a slot of the at least one view port for retaining the plug within a bore of the at least one view port.

In a further non-limiting embodiment of any of the foregoing duct assemblies, a case interfaces with the flange at a joint between the case and the casing body.

In a further non-limiting embodiment of any of the foregoing duct assemblies, a plurality of discrete cooling passages are cast in the casing body and configured to channel the cooling fluid to condition hardware positioned at least partially outboard from the casing body.

In a further non-limiting embodiment of any of the foregoing duct assemblies, a plurality of view ports are annularly spaced along the wall, each of the plurality of view ports providing a line of sight to the flange.

A gas turbine engine according to an exemplary aspect of the present disclosure includes, among other things, a case having at least one opening that communicates a cooling fluid and a duct assembly connected to the case to define a joint. The duct assembly has a casing body, at least one discrete cooling passage formed in the casing body, and at least one view port configured to provide visualization of at least a portion of the joint.

In a further non-limiting embodiment of the foregoing gas turbine engine, the at least one discrete cooling passage is configured to communicate the cooling fluid between a first location and a second location of the gas turbine engine.

In a further non-limiting embodiment of either of the foregoing gas turbine engines, a second cooling fluid is communicated across at least one airfoil of the duct assembly to a third location of the gas turbine engine.

In a further non-limiting embodiment of any of the foregoing gas turbine engines, the duct assembly includes a plurality of discrete cooling passages circumferentially spaced apart and axially extending through the casing body.

In a further non-limiting embodiment of any of the foregoing gas turbine engines, the duct assembly includes a plurality of view ports that provide a line of sight to the joint.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a duct assembly, such as a TOBI assembly, for a gas turbine engine. The exemplary duct assembly is an integral, single-piece structure that is annularly disposed about an engine centerline longitudinal axis of the gas turbine engine. As detailed herein, among other features, the duct assembly may include at least one discrete cooling passage and view port formed in an annular body. The discrete cooling passage channels a cooling fluid to hardware of the engine, and the view port allows an assembler to ensure proper mating of a joint between the duct assembly and a case of the engine during an assembly procedure.

Figure 1:
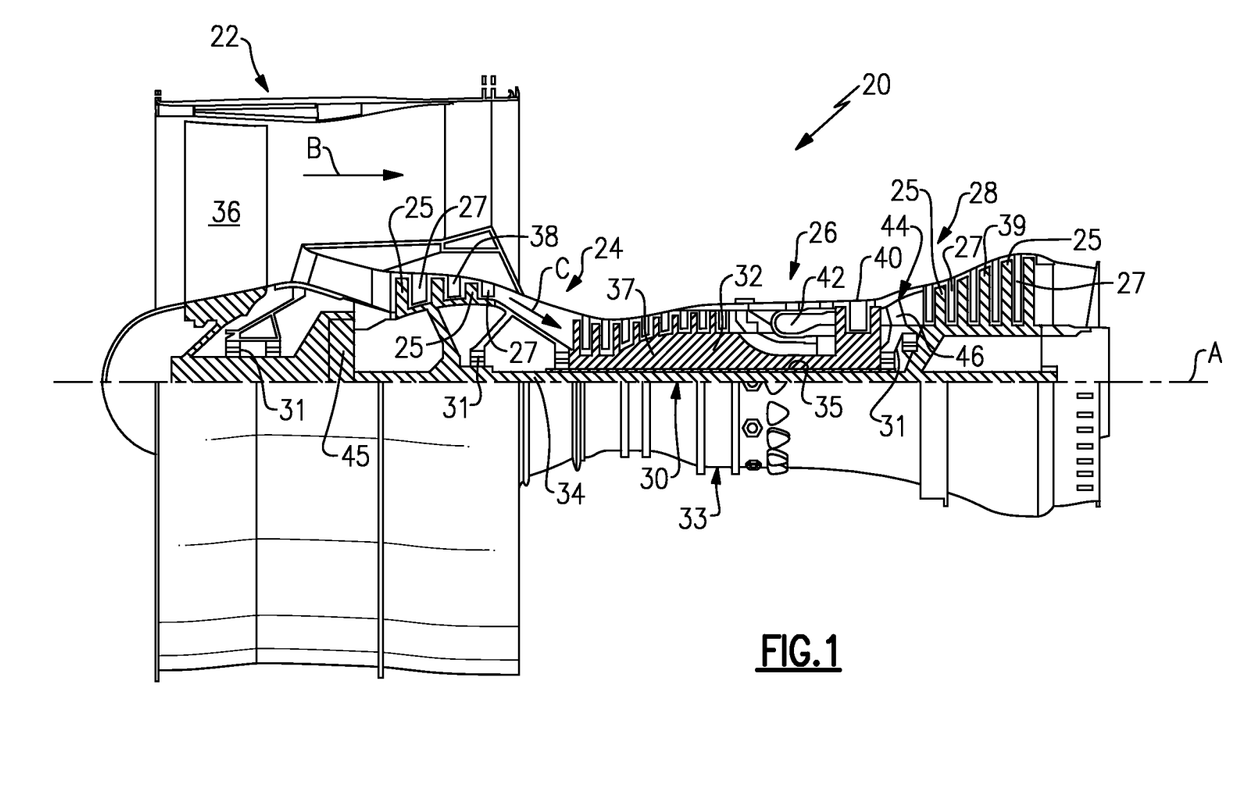
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram° R)/(518.7° R)]^{0.5}$. The Low Corrected Fan Tip Speed according to one non-limiting embodiment of the example gas turbine engine 20 is less than about 1150 fps (351 m/s).

The compressor section 24 and the turbine section 28 may include alternating rows of rotor assemblies and stator assemblies (shown schematically) that carry airfoils. For example, rotor assemblies carry a plurality of rotating blades 25, while stator assemblies carry stationary stators 27 (or vanes) that extend into the core flow path C to influence the hot combustion gases. The blades 25 create or extract energy (in the form of pressure) from the core airflow that is communicated through the gas turbine engine 20 along the core flow path C. The stators 27 direct the core airflow to the blades 25 to either add or extract energy.

Figure 2:
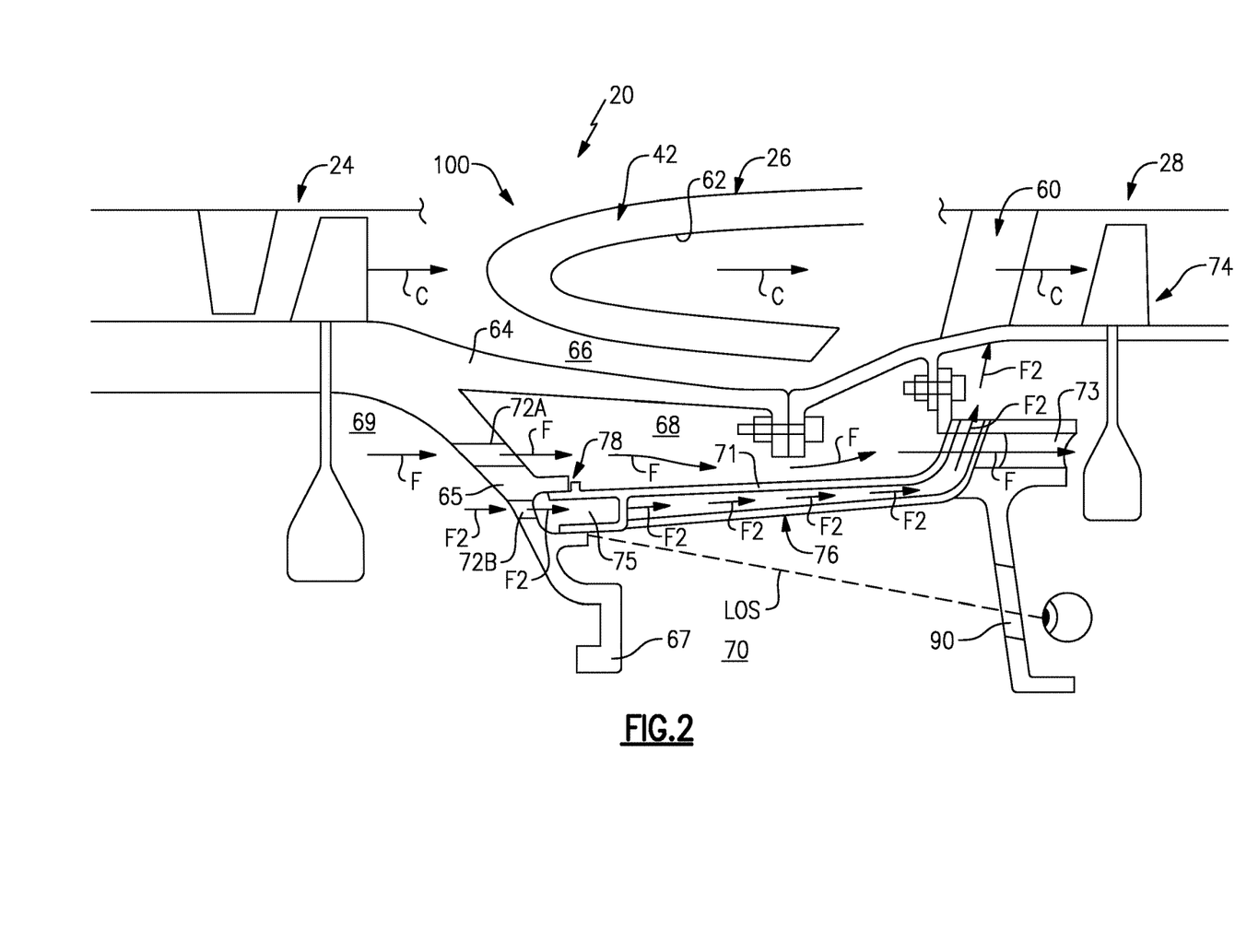
FIG. 2 illustrates a cross-sectional view of a portion of a gas turbine engine that includes a duct assembly.

FIG. 2 illustrates a portion 100 of a gas turbine engine, such as the gas turbine engine 20 of FIG. 1. In this embodiment, the portion 100 encompasses parts of the compressor section 24, the combustor section 26 and the turbine section 28. However, it should be understood that this disclosure could extend to other sections of the gas turbine engine 20 beyond what is shown by FIG. 2.

In operation, core airflow from the core flow path C passes from the compressor section 24 through the combustor section 26 to the turbine section 28. A vane assembly 60 may be arranged downstream from a combustor shell 62 of a combustor 42 of the combustor section 26 and upstream from the turbine section 28 to direct core airflow from the core flow path C to the turbine section 28. The turbine section 28 includes at least one rotor assembly 74 that is rotatable to extract energy from the core airflow that is communicated along the core flow path C.

A diffuser case 64 extends radially inwardly from the combustor shell 62 and divides an interior 66 of the portion 100 into at least an outer cavity 68 and an inner cavity 70. A duct assembly 76 may be connected to the diffuser case 64 at a joint 78. In one embodiment, the diffuser case 64 includes an extension 65 and the joint 78 is located along a portion of the extension 65. In other words, the duct assembly 76 interfaces with the extension 65. Although not shown, a bearing system may be attached to a radially inner portion 67 of the diffuser case 64.

In one embodiment, the duct assembly 76 is a TOBI assembly or other suitable assembly that is capable of channeling a cooling fluid, as is discussed in greater detail below. The duct assembly 76 axially extends to a position adjacent to hardware of the turbine section 28, including but not limited to the rotor assembly 74 and the vane assembly 60.

The diffuser case 64 may include multiple openings 72 for communicating cooling fluids F, F2 from a first location, such as the compressor section 24, to a second location, such as the turbine section 28, of the gas turbine engine 20. In one embodiment, the cooling fluids F, F2 are bleed airflows bled from an inner cavity 69 of the compressor section 24. However, the cooling fluids F, F2 could be any fluid from any portion of the gas turbine engine 20.

The openings 72 may extend through the extension 65 of the diffuser case 64. Any number of openings 72 could be disposed at any portion of the diffuser case 64 within the scope of this disclosure.

In one embodiment, a first opening 72A opens into the outer cavity 68. Cooling fluid F from the compressor section 24 may be communicated through the first opening 72A, and then through the outer cavity 68, to condition (i.e., heat or cool) portions of the turbine section 28. The cooling fluid F can matriculate along an outer surface 71 of the duct assembly 76. In addition, in one non-limiting embodiment, the duct assembly 76 may include one or more airfoils 73 for directing the cooling fluid F to the turbine section 28 to cool the rotor assembly 74.

A second opening 72B may extend through the extension 65 of the diffuser case 64 and open into a plenum 75 near the joint 78. A second cooling fluid F2 may be communicated from the compressor section 24, into the plenum 75, and then through the duct assembly 76, to condition the vane assembly 60 of the turbine section 28. In other words, the cooling fluids F, F2 can address different hardware cooling requirements of the portion 100. In one embodiment, the duct assembly 76 imparts a swirling movement to the second cooling fluid F2 and communicates the second cooling fluid in a tangential direction to cool radially outboard hardware.

The cooling fluid F and the second cooling fluid F2 may be communicated onboard of any hardware of the gas turbine engine 20. It should be appreciated that other parts, components, stages and portions than are illustrated by FIG. 2 may be conditioned by various cooling fluids that are ducted through, across and/or around the duct assembly 76.

The duct assembly 76 can additionally include one or more view ports 90. The view ports 90 provide an assembler with a direct line of sight LOS to the joint 78. The LOS allows the assembler to confirm that the joint 78 between the diffuser case 64 and the duct assembly 76 has been correctly mated during an assembly procedure.

Figure 3:
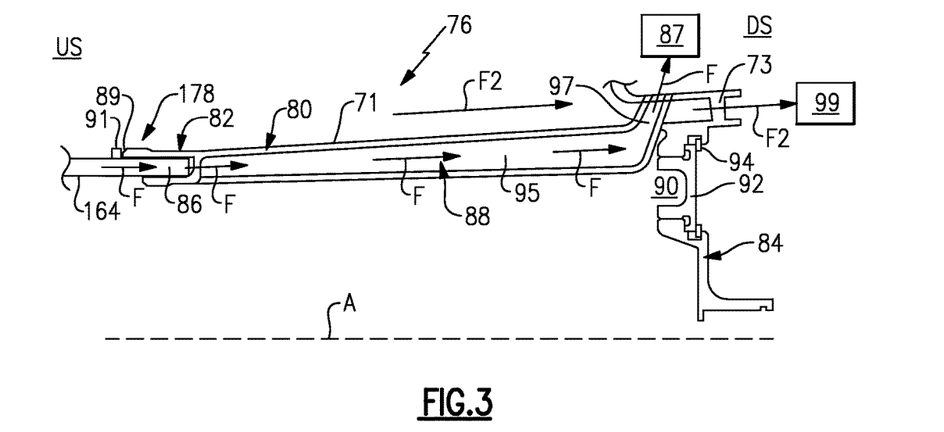
FIG. 3 illustrates one embodiment of a duct assembly that can be incorporated into a gas turbine engine.

FIG. 3 illustrates one embodiment of a duct assembly 76 that is configured to channel cooling fluids between at least two different locations of a gas turbine engine. The duct assembly 76 includes a casing body 80 that may be annularly disposed about an engine centerline longitudinal axis A. In one non-limiting embodiment, the casing body 80 is an integral, single-piece casting that axially extends between a flange 82 and a wall 84. The flange 82 may annularly extend about the engine centerline longitudinal axis A at an upstream side US of the duct assembly 76, whereas the wall 84 may be annularly disposed at a downstream side DS of the duct assembly 76.

The flange 82 interfaces with a case 164 at a joint 178 between the two parts. In one embodiment, the case 164 is a diffuser case of a gas turbine engine. However, the case 164 could be some other structural member of the engine.

In one embodiment, the joint 178 is a male/female connection with the flange 82 defining the female portion of the connection and an end 86 of the case 164 defining the male connection. Of course, an opposite configuration is also contemplated in which the casing is configured as the female portion and the flange is configured as the male portion (see, for example, the joint 78 of FIG. 2). In one embodiment, the end 86 of the case 164 is inserted into the flange 82 to a position in which an end 89 of the flange 82 abuts a protrusion 91 of the case 164.

The duct assembly 76 may also include at least one discrete cooling passage 88 formed through the casing body 80. The discrete cooling passage 88 axially extends through the casing body 80 between the flange 82 and the wall 84. The discrete cooling passage 88 communicates a cooling fluid F for conditioning a first component 87. A separate cooling fluid F2 may be communicated along an outer surface 71 of the casing body 80. The separate cooling fluid F2 is communicated across one or more airfoils 73 of the duct assembly 76, which are positioned outboard from the wall 84, to condition a second component 99 that is different from the first component 87. The components 87, 99 may be any component of a gas turbine engine that must be cooled with a dedicated cooling fluid.

In one embodiment, the discrete cooling passage 88 includes an axial portion 95 and a tangential portion 97. The cooling fluid F may be communicated from the axial portion 95 and then into the tangential portion 97. The tangential portion 97 may turn a flow of the cooling fluid F in order to direct a stream of the cooling fluid F radially outboard to more efficiently condition the first component 87, which may be positioned at least partially radially outboard of the duct assembly 76.

At least one view port 90 may be disposed through the wall 84 of the duct assembly 76. The view port 90 enables visual confirmation of a proper connection between the duct assembly 76 and the case 164 at the joint 178 during assembly. A plug 92 may be positioned within the view port 90 to selectively close and seal the view port 90. A retainer 94 retains the plug 92 within the view port 90. In one embodiment, the retainer 94 is a snap ring. Alternatively, the plug 92 could be bolted or otherwise affixed relative to the wall 84.

Figure 4A:
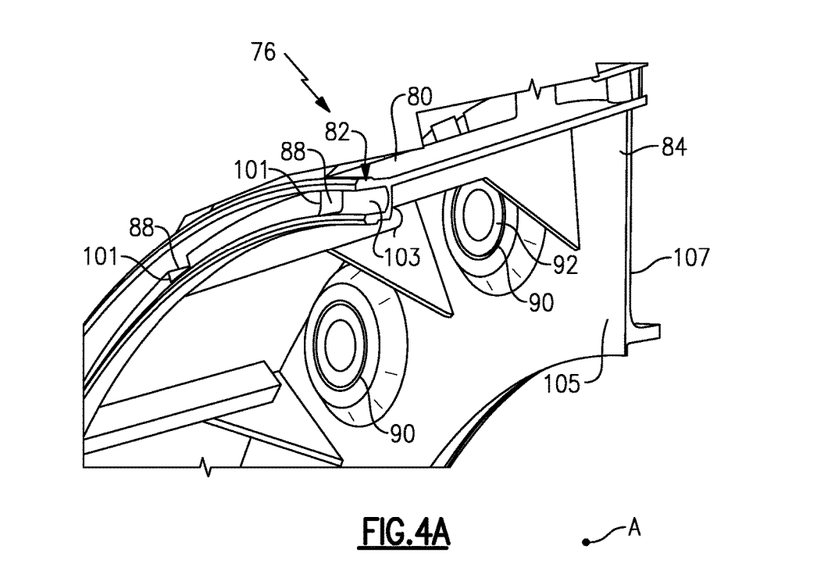
FIGS. 4A and 4B illustrate various features of the exemplary duct assembly of FIG. 3.
Figure 4B:
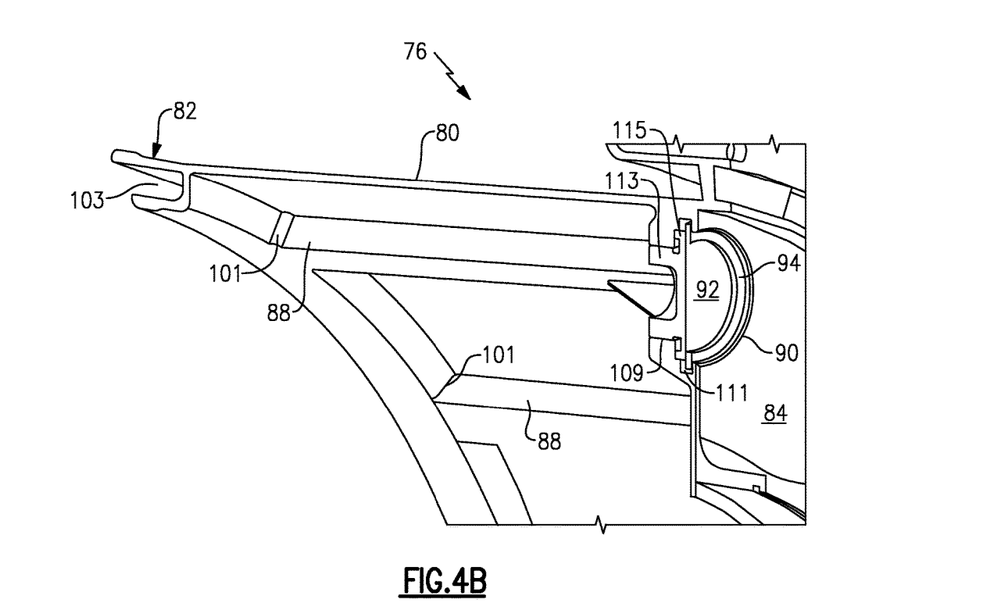

Referring to FIGS. 4A and 4B, an exemplary duct assembly 76 may include a plurality of discrete cooling passages 88 that are circumferentially spaced apart from one another and axially extend through the casing body 80. In one embodiment, the discrete cooling passages 88 are cast as part of the casing body 80. The plurality of discrete cooling passages 88 define conduits for channeling cooling fluids through the casing body 80. Each discrete cooling passage 88 can include an inlet 101, which may be located within a recess 103 of the flange 82, for directing cooling fluids into the discrete cooling passage 88. The total number of discrete cooling passages 88 cast into the casing body 80 may depend on the amount of cooling fluid necessary to meet the cooling requirements of the first component 87 and/or other hardware of the gas turbine engine, among other design specific factors.

In one embodiment, the duct assembly 76 includes a plurality of view ports 90 that are annularly spaced from one another. The view ports 90 extend between opposing surfaces 105, 107 of the wall 84. Any number of view ports 90 may be formed in the duct assembly 76 to provide visualization of a joint between the duct assembly 76 and an interfacing case (see, for example, the joint 78 of FIG. 2 or joint 178 of FIG. 3).

As best illustrated by FIG. 4B, each view port 90 may include a bore 109 and a slot 111 that circumscribes the bore 109. A plug 92 may be received within each view port 90 and is removable to expose the view port 90 for visualization of portions of the duct assembly 76. In one embodiment, the plug 92 includes a main body 113 and a flange 115 that extends radially outwardly from the main body 113. The main body 113 may be received within the bore 109 of the view port 90 and the flange 115 may extend into the slot 111 of the view port 90 to plug the view port 90 when not being used for visualization purposes. A retainer 94, such as a snap ring, may be inserted into the slot 111 to retain the plug 92 within the view port 90.

Figure 5:
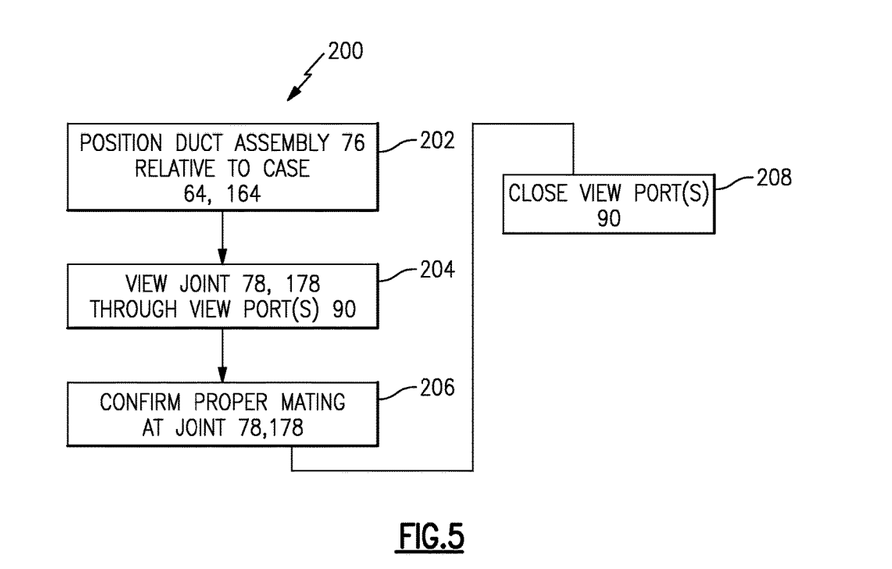
FIG. 5 illustrates a gas turbine engine assembly method.

FIG. 5, with continued reference to FIGS. 1-4, schematically illustrates an exemplary gas turbine engine assembly method 200. First, at step 202, the duct assembly 76 may be positioned relative to a case 64, 164 of a gas turbine engine. Next, at step 204, an assembler may view a joint 78, 178 between the case 64, 164 and the duct assembly 76 through one or more view ports 90. If necessary, a plug 92 is removed from each view port 90 prior to preforming step 204. The assembler utilizes the view ports 90 to ensure that the joint 78, 178 has been correctly mated, such as by snap fitting the duct assembly 76 to the case 64, 164. In one embodiment, the assembler uses his/her own eyesight to view the joint 78, 178 through the view ports 90. Alternatively, a borescope may be inserted through the view port 90 to view the joint 78, 178.

The assembler confirms proper mating of the joint 78, 178 at step 206. The assembler may properly mate the duct assembly 76 to the case 64, 164 if visualization confirms that the proper mating has not yet been achieved. Once a proper mating has been confirmed by viewing through one or more of the view ports 90, each view port 90 may be closed with a plug 92 at step 208. A cooling fluid may be communicated through each discrete cooling passage 88 once the duct assembly 76 has been properly assembled within a gas turbine engine.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A duct assembly, comprising:
a casing body that extends between a flange and a wall;
a first discrete cooling passage formed in said casing body;
a second discrete cooling passage circumferentially spaced from said first discrete cooling passage, wherein at least one of said first discrete cooling passage and said second discrete cooling passage includes an axial portion and a tangential portion configured to turn a cooling fluid communicated in each of said first and second discrete cooling passages;
a case that interfaces with said flange at a joint between said case and said casing body such that said at least one of said first discrete cooling passage and said second discrete cooling passage extends from said joint, said joint being a male/female connection with one of said flange and an end of said case defining a female portion of said connection and another one of said flange and said end of said case defining a male portion of said connection; and
at least one view port that extends through said wall, said at least one view port providing a line of sight to said joint.

2. The duct assembly as recited in claim 1, wherein said duct assembly is a tangential onboard injection (TOBI) assembly.

3. The duct assembly as recited in claim 1, comprising a first component that is conditioned by said cooling fluid.

4. The duct assembly as recited in claim 3, comprising a second component that is conditioned by a second cooling fluid communicated along an outer surface of said casing body, said second component different from said first component.

5. The duct assembly as recited in claim 1, comprising a plug removably insertable into said at least one view port.

6. The duct assembly as recited in claim 5, comprising a retainer received within a slot of said at least one view port for retaining said plug within a bore of said at least one view port.

7. The duct assembly as recited in claim 1, comprising a plurality of discrete cooling passages cast in said casing body and configured to channel said cooling fluid to condition hardware positioned at least partially outboard from said casing body.

8. The duct assembly as recited in claim 1, wherein the at least one view port is a plurality of view ports annularly spaced along said wall, each of said plurality of view ports providing a line of sight to said flange.

9. The duct assembly as recited in claim 1, wherein said first discrete cooling passage includes said axial portion and said tangential portion, and said axial portion extends from said joint.

10. The duct assembly as recited in claim 9, wherein said end of said case is insertable into said flange such that an end of said flange abuts a protrusion of said case.

11. A gas turbine engine, comprising:
a case having at least one opening that communicates a cooling fluid;
a duct assembly including a flange connected to said case to define a joint;
said duct assembly having a casing body, at least one discrete cooling passage formed in said casing body that extends between said flange and a wall, and at least one view port defined in said wall that is configured to provide visualization of at least a portion of said joint;
wherein said joint is a male/female connection including a male portion insertable into a female portion such that said at least one discrete cooling passage extends from said joint; and
wherein said at least one view port provides a line of sight to said joint.

12. The gas turbine engine as recited in claim 11, wherein said at least one discrete cooling passage is configured to communicate said cooling fluid between a first location and a second location of the gas turbine engine.

13. The gas turbine engine as recited in claim 12, comprising a second cooling fluid communicated across at least one airfoil of said duct assembly to a third location of the gas turbine engine.

14. The gas turbine engine as recited in claim 13, wherein said at least one discrete cooling passage extends from said joint, and said at least one discrete cooling passage includes an axial portion and a tangential portion configured to turn a cooling fluid communicated from said at least one opening to said at least one discrete cooling passage.

15. The gas turbine engine as recited in claim 14, wherein said case is a diffuser case of a combustor section that extends radially inwardly from a combustor shell, and said wall is positioned adjacent to a rotor assembly of a turbine section.

16. The gas turbine engine as recited in claim 15, wherein said at least one discrete cooling passage is a plurality of discrete cooling passages circumferentially spaced apart and axially extending through said casing body.

17. The gas turbine engine as recited in claim 11, wherein said duct assembly includes a plurality of discrete cooling passages circumferentially spaced apart and axially extending through said casing body.

18. The gas turbine engine as recited in claim 11, wherein said duct assembly includes a plurality of view ports that provide a line of sight to said joint.

* * * * *